US012669736B2

(12) United States Patent
Lu et al.

(10) Patent No.: US 12,669,736 B2
(45) Date of Patent: Jun. 30, 2026

(54) SINGLE-FREQUENCY CONTINUOUS-WAVE OPTICAL PARAMETRIC OSCILLATOR

(71) Applicant: SHANXI UNIVERSITY, Taiyuan (CN)

(72) Inventors: Huadong Lu, Taiyuan (CN); Xiaobin Peng, Taiyuan (CN); Jing Su, Taiyuan (CN); Kunchi Peng, Taiyuan (CN)

(73) Assignee: SHANXI UNIVERSITY, Taiyuan (CN)

( * ) Notice: Subject to any disclaimer, the term of this patent is extended or adjusted under 35 U.S.C. 154(b) by 347 days.

(21) Appl. No.: 18/426,378

(22) Filed: Jan. 30, 2024

(65) Prior Publication Data

US 2024/0353735 A1      Oct. 24, 2024

(30) Foreign Application Priority Data

Apr. 19, 2023    (CN) .......................... 202310420787.6

(51) Int. Cl.
*G02F 1/39* (2006.01)
*G02F 1/35* (2006.01)
(Continued)

(52) U.S. Cl.
CPC .............. *G02F 1/39* (2013.01); *G02F 1/3503* (2021.01); *G02F 1/3509* (2021.01);
(Continued)

(58) Field of Classification Search
CPC ................................................. G02F 1/39–397
See application file for complete search history.

(56) References Cited

U.S. PATENT DOCUMENTS

2024/0353735 A1 * 10/2024 Lu .......................... H01S 3/0092

FOREIGN PATENT DOCUMENTS

| CN | 102946047 | 2/2013 |
| CN | 103715593 | 4/2014 |

(Continued)

OTHER PUBLICATIONS

Wang Hailong et al., "Experimental study on near-infrared to mid infrared laser output based on a single resonant optical parametric oscillator", Chinese Laser, vol. 49, Issue 18—Sep. 30, 2022.

*Primary Examiner* — Rhonda S Peace
(74) *Attorney, Agent, or Firm* — SOROKER AGMON NORDMAN RIBA

(57) ABSTRACT

The present application discloses a single-frequency continuous-wave optical parametric oscillator, comprising a pumping source, a focusing lens, a resonant cavity, an optical parametric down-conversion crystal, and a birefringent crystal. The resonant cavity comprises a concave-convex lens, an output planoconcave lens, and at least two transitional planoconcave lenses; and a waist spot of pump light obtained through the focusing lens is located between the concave-convex lens and a first transitional planoconcave lens adjacent to the concave-convex lens on a light path. The center of the optical parametric down-conversion crystal coincides with a waist spot of the pump light; the birefringent crystal is located at the beam waist between the output planoconcave lens and the second transitional planoconcave lens adjacent to the output planoconcave lens on the light path; and the birefringent crystal adopts a critical phase matching or non-critical phase matching mode.

15 Claims, 4 Drawing Sheets

(51) Int. Cl.
    *H01S 3/00*         (2006.01)
    *H01S 3/094*      (2006.01)
    *H01S 3/108*      (2006.01)

(52) U.S. Cl.
    CPC ...... *H01S 3/0092* (2013.01); *H01S 3/094038*
              (2013.01); *H01S 3/1083* (2013.01)

(56)                References Cited

FOREIGN PATENT DOCUMENTS

| CN | 104218444 | | 12/2014 | | |
| --- | --- | --- | --- | --- | --- |
| CN | 105514779 | | 4/2016 | | |
| CN | 111697425 | A * | 9/2020 | ........... | H01S 3/1083 |
| WO | 1998001927 | | 1/1998 | | |

* cited by examiner

SINGLE-FREQUENCY CONTINUOUS-WAVE OPTICAL PARAMETRIC OSCILLATOR

TECHNICAL FIELD

The present application relates to the field of optoelectronic and laser technology, and more particularly to single-frequency continuous-wave optical parametric oscillators.

BACKGROUND ART

Tunable, high-power, continuous laser sources are prerequisites for numerous applications in optical fields. The advent of optical parametric oscillators (OPO) provides a good operating condition for such laser sources. The advantages are simple tuning mode with a wide range and fast tuning from ultraviolet to infrared band, simple structure, good output light stability, and narrow line width. These advantages make optical parametric oscillators more and more applicable in quantum optics, atomic physics, precision measurement, and other fields. However, with the development and application of the technology, higher requirements are raised on single-frequency operations, frequencies stability and power stability of optical parametric oscillators, which requires better single-frequency stable operation of optical parametric oscillators.

At present, the following methods are adopted to realize single-frequency operations of optical parametric oscillators.

The first is to insert an etalon in an optical resonant cavity, lock the transmission peak of the etalon in the cavity to the resonant mode of the optical parametric oscillator resonant cavity, and adjust the angle of the etalon in real time to achieve single-frequency operation. The manner in which the etalon is mode-locked requires only the insertion of an etalon within the resonant cavity and the application of a corresponding servo system. However, due to the limitations of parameters, thicknesses, and like factors of the coating on the surface of the etalon, the laser beam will reflect when passing through the etalon and like circumstances will also happen, thereby increasing the difficulty in the process of closing the resonant cavity. The insertion loss introduced by the insertion of an etalon further limits the power of the output light and the conversion efficiency of the pump light. Furthermore, when the angle of an etalon is adjusted, a modulation signal is usually applied to adjust the angle of the etalon, which will lead to the introduction of additional noise. This is not conducive to the application of optical parametric oscillators in the fields of quantum precision measurement, continuous variable non-classical light field, etc.

Another method to achieve single-frequency operation of optical parametric oscillators is to use injection locking technology, which selects light of a specific frequency as seed light to be injected into the resonant cavity to improve the output power, and stabilizes the power stability of the output light and single longitudinal mode operation. This requires a separate laser system as well as a frequency stabilization system, where the overall laser system will become bulky, and slight perturbations will affect the stability of the overall system. This also brings difficulties in modulation, and is not conducive to the miniaturization and productization of optical parametric oscillators.

In addition, the signal light oscillating in the resonant cavity has a serious impact on the thermal effect of the optical parametric oscillator crystal, which can cause multimode oscillation at high power. At the same time, the high power of the resonant light in the cavity, the pumping ratio, and like factors can also affect the mode hopping and multimode oscillation phenomena of the optical parametric oscillators, reducing the stability of the overall system.

SUMMARY OF THE INVENTION

The present application provides a single-frequency continuous-wave optical parametric oscillator. An optical parametric down-conversion crystal is placed at the waist spot of a pump light and generates a signal light, and a birefringent crystal is placed at the waist spot of the signal light and generates a frequency-doubled light. On the one hand, this can automatically modulate the coupling output of signal light in the resonant cavity while maintaining high conversion efficiency, thereby achieving complete pumping emptying. On the other hand, birefringent crystals can introduce sufficient nonlinear losses in the resonant cavity to suppress secondary mode oscillations in the resonant cavity, effectively suppressing the occurrence of multimode oscillations and mode hopping phenomena in the resonant cavity, and achieving a long-term stable single-frequency operation. Therefore, the output of single-frequency signal light is realized through the insertion of a birefringent crystal, without inserting an etalon or injecting seed light, which reduces the cost. Besides, it is compact and small in structure, making full curing, integration, miniaturization, and volume production of productization easier.

The present application provides a single-frequency continuous-wave optical parametric oscillator comprising a pumping source, a focusing lens, a resonant cavity, an optical parametric down-conversion crystal, and a birefringent crystal;

the polarization direction of a pump light provided by the pumping source is horizontal polarization; the resonant cavity comprises a concave-convex lens, an output planoconcave lens and at least two transitional planoconcave lenses arranged between the concave-convex lens and the output planoconcave lens, a waist spot of the pump light obtained by the focusing lens is located between the concave-convex lens and a first transitional planoconcave lens adjacent to the concave-convex lens on an optical path, and the center of the optical parametric down-conversion crystal coincides with the waist spot of the pump light; and the birefringent crystal is located at a beam waist between the output planoconcave lens and a second transitional planoconcave lens adjacent to the output planoconcave lens on an optical path, and the birefringent crystal adopts critical phase matching or non-critical phase matching so as to generate frequency-doubled light.

Preferably; signal light generated by the optical parametric down-conversion crystal resonates in the resonant cavity, and the pump light, the idler light generated by the optical parametric down-conversion crystal, and the frequency-doubled light generated by the birefringent crystal pass through the resonant cavity in a single pass.

Preferably, the resonant cavity is a ring cavity.

Preferably, in the ring cavity, the signal light passes through the concave-convex lens, the optical parametric down-conversion crystal, the first transitional planoconcave lens, the second transitional planoconcave lens, the birefringent crystal and the output planoconcave lens in sequence.

Preferably, the concave surface of the output planoconcave lens is plated with a high-transmittance film for frequency-doubled light and a partial-transmittance film for signal light.

Preferably, the surface of the first transitional planoconcave lens is plated with a high-transmittance film for pump light and idler light and a high-reflection film for signal light.

Preferably, the resonant cavity is a standing wave cavity, and in the standing wave cavity, the first transitional planoconcave lens and the output planoconcave lens are the same planoconcave lens, and the signal light passes through the concave-convex lens, the optical parametric down-conversion crystal, the first transitional planoconcave lens, the birefringent crystal, the second transitional planoconcave lens, the birefringent crystal and the first transitional planoconcave lens in sequence.

Preferably, the concave surface of the first transitional planoconcave lens is plated with a high-transmittance film for pump light, idler light and frequency-doubled light and a high-reflection film for signal light.

Preferably, the birefringent crystal has a shape of a fan-shaped structure, a cuboid with a flat or wedged end face, or a cube with a flat or wedged end face.

Preferably, the pumping source is an all-solid-state solid laser and the resonant cavity is end-pumped. Other features and advantages of the present application will become apparent from the following detailed description of exemplary embodiments of the present application with reference to the accompanying drawings.

BRIEF DESCRIPTION OF THE DRAWINGS

The accompanying drawings, which are incorporated into and form a part of the present application illustrate embodiments of this description and are used together with their explanations to explain the principles of the present application.

DETAILED DESCRIPTION OF THE INVENTION

Figure 1:
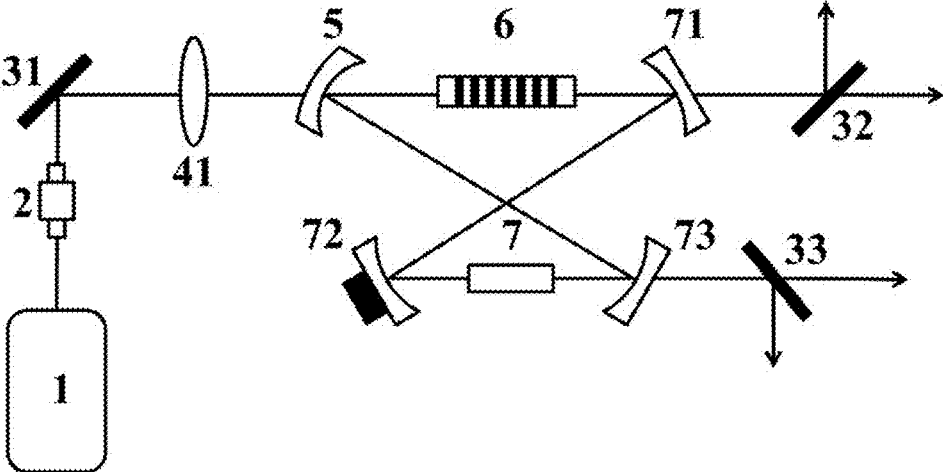
FIG. 1 is a schematic diagram of an optical path structure of embodiment 1 of a single-frequency continuous-wave optical parametric oscillator provided by the present application.

Various exemplary embodiments of the present application will now be described in detail with reference to the accompanying drawings. It should be noted that: the relative arrangement of the components and steps, the numerical expressions and values set forth in these embodiments do not limit the present application, unless otherwise specifically illustrated.

The description of at least one exemplary embodiment below is actually only illustrative and does not serve as any limitation on the present application, and the application or use thereof.

Techniques, methods, and devices known to those of ordinary skill in the relevant art may not be discussed in detail, but the techniques, methods, and devices should be considered part of the description where appropriate.

In all examples shown and discussed herein, any particular value should be interpreted as illustrative only and not as limiting. Therefore, other examples of exemplary embodiments may have different values.

The present application provides a single-frequency continuous-wave optical parametric oscillator comprising a pumping source, a focusing lens, a resonant cavity, an optical parametric down-conversion crystal, and a birefringent crystal. The polarization direction of the pump light provided by the pumping source is horizontal polarization; the pump light obtained by the pump horizontally polarized laser provided by the pumping source passing through the focusing lens is input into the resonant cavity; the resonant cavity generates signal light, idler light, and frequency-doubled light by using the optical parametric down-conversion process and frequency doubling process of optical parametric down-conversion crystals and birefringent crystals, and outputs single-frequency signal light and single frequency frequency-doubled light.

Specifically, the resonant cavity includes a concave-convex lens, an output planoconcave lens, and at least two transitional planoconcave lenses disposed between the concave-convex lens and the output planoconcave lens. The waist spot of the pump light obtained through the focusing lens is located between the concave-convex lens and the first transitional planoconcave lens adjacent to the concave-convex lens on the optical path, the center of the optical parametric down-conversion crystal coincides with the waist spot of the pump light, and the pump light generates signal light and idler light when passing through the optical parametric down-conversion crystal. The optical parametric down-conversion crystal is a periodic polarized crystal, and the wavelength can be changed by changing the controlled temperature of the crystal. Therefore, the optical parametric oscillator crystal with this structure can achieve a wide range of bands of laser output from visible light to near-infrared or even mid-infrared band, which broadens the spectral range of optical parametric oscillators.

The birefringent crystal is located at a beam waist between the output planoconcave lens and a second transitional planoconcave lens adjacent to the output planoconcave lens in the optical path. Birefringent crystals employ critical phase matching or non-critical phase matching to produce frequency-doubled light.

Placing the birefringent crystal at the waist spot of the signal light (namely, the beam waist between the output planoconcave lens and the second transitional planoconcave lens) and generating the frequency-doubled light, on the one hand, can automatically modulate the coupling output of signal light in the resonant cavity while maintaining high conversion efficiency; thereby achieving complete pumping emptying. On the other hand, birefringent crystals can introduce sufficient nonlinear losses in the resonant cavity to suppress secondary mode oscillations in the resonant cavity, effectively suppressing the occurrence of multimode oscillations and mode hopping phenomena in the resonant cavity, and achieving a long-term stable single-frequency operation. Therefore, the output of single-frequency signal light and single-frequency frequency-doubled light is realized through the insertion of a birefringent crystal, without inserting an etalon or injecting seed light, which reduces the cost. Besides, it is compact and small in structure, making full curing, integration, miniaturization, and volume production of productization easier.

Specifically, as one embodiment, the beam transmission matrix within the resonant cavity is used to simulate the relationships when the stable region of the resonant cavity changes with the distances between the cavity lenses so as to find the most stable working state. The position of the waist spot of the signal light in the optical parametric down-conversion crystal and the output of the signal light at the watt level are manipulated by controlling the distances between the cavity lenses. The waist spot of the cavity mode of the resonant cavity at the optical parametric down-conversion crystal is determined according to the position of the pump light at the optical parametric down-conversion crystal and the size of the waist spot.

The optical parametric down-conversion crystal as well as the birefringent crystal adopts specific temperatures to achieve the desired output wavelength and to achieve the maximum conversion efficiency.

As one embodiment, the birefringent crystal has the shape of a fan-shaped structure, a cuboid with a flat or wedged end face, or a cube with a flat or wedged end face. The birefringent crystal may be a lithium triborate crystal LBO, a potassium titanium oxide phosphate crystal KTP, a barium metaborate crystal BBO, a bismuth borate crystal BIBO, etc.

As one embodiment, the pumping source is an all-solid-state solid laser, and the resonant cavity is end-face-pumped to achieve more accurate mode matching and laser output with high beam quality.

As one embodiment, the optical parametric down-conversion crystal and the birefringent crystal are wrapped in indium foil and placed in a copper furnace. The copper furnace is temperature controlled by using a temperature controller with a temperature control accuracy of 0.01° C. Precise temperature control of the crystal can improve the conversion efficiency of the crystal.

On the basis of above, it is preferable that the signal light generated by the optical parametric down-conversion crystal resonates in the resonant cavity, and the pump light, the idler light, and the frequency-doubled light pass through the resonant cavity in a single pass, thereby making it possible to operate unidirectionally without adding an isolator in the resonant cavity.

The present application inserts a nonlinear crystal in an optical resonant cavity, which has a certain loss on the signal light resonated in the cavity, and this loss is called a nonlinear loss. On the one hand, the introduction of nonlinear loss can greatly reduce intensity of the signal light oscillating in the cavity while suppressing the multi-longitudinal mode operation of the optical parametric oscillator, thereby achieving stable single-frequency operation and ensuring automatic pumping emptying without changing the resonant cavity parameters. On the other hand, the working performance of the optical parametric oscillator can be improved greatly, which can make the optical parametric oscillator realize stable single-frequency operation and more stable laser output in a wider pumping range.

Embodiment 1

FIG. 1 is a schematic diagram of an optical path structure of embodiment 1 of a single-frequency continuous-wave optical parametric oscillator provided by the present application. As shown in FIG. 1, a single-frequency continuous-wave optical parametric oscillator comprises a pumping source 1, a focusing lens 41, a resonant cavity, an optical parametric down-conversion crystal 6, and a birefringent crystal 7. The pump horizontally polarized laser light provided by the pumping source 1 passes through an optical isolator 2 and is reflected by the first plane mirror 31 to the focusing lens 41.

In this embodiment, the resonant cavity is a four-mirror ring cavity comprising a concave-convex lens 5, a first transitional planoconcave lens 71, a second transitional planoconcave lens 72, and an output planoconcave lens 73. The waist spot of the pump light obtained through the focusing lens 41 is located between the concave-convex lens 5 and the first transitional planoconcave lens 71, the center of the optical parametric down-conversion crystal 6 coincides with the waist spot of the pump light, a part of the pump light generates signal light and idler light after passing through the optical parametric down-conversion crystal 6, and the other part of the pump light directly passes through the optical parametric down-conversion crystal 6. The birefringent crystal 7 is located at the beam waist between the output planoconcave lens 73 and the second transitional planoconcave lens 72. The birefringent crystal 7 uses critical phase matching or non-critical phase matching to generate the frequency-doubled light.

The surface of the concave-convex lens 5 is plated with a high-transmittance film for pump light and a high-reflection film for signal light. The surface of the first transitional planoconcave lens 71 is plated with a high-transmittance film for pump light and idler light and a high-reflection film for signal light. The surface of the second transitional planoconcave lens 72 is plated with a high-reflection film for signal light. The surface of the output planoconcave lens 73 is plated with a partial-transmittance film (e.g. 1%) for signal light and a high-transmittance film for frequency-doubled light.

As one embodiment, the outside of the single-frequency continuous-wave optical parametric oscillator is provided with a second plane mirror 32 and a third plane mirror 33; all of the pump light directly passing through the optical parametric down-conversion crystal 6 and the idler light generated by the optical parametric down-conversion crystal 6 are transmitted through the first transitional planoconcave lens 71 and reach the second plane mirror 32; the second plane mirror 32 is used for separating the pump light and the idler light output by the first transitional planoconcave lens 71; the pump light is transmitted through the second plane mirror 32 and output; and the idler light is reflected by the second plane mirror 32 and output. The frequency-doubled light generated by the birefringent crystal 7 is output after being completely transmitted through the output planoconcave lens 73, and a part of the signal light is output after being transmitted through the output planoconcave lens 73; the third plane mirror 33 is used for separating the signal light and the frequency-doubled light; the frequency-doubled light is output after being reflected by the third plane mirror 33; and the signal light is output after being transmitted through the third plane mirror 33. At the same time, the remaining part of the signal light resonates in the ring cavity.

Specifically, in the ring cavity, the remaining part of the signal light passes through the concave-convex lens 5, the optical parametric down-conversion crystal 6, the first transitional planoconcave lens 71, the second transitional planoconcave lens 72, the birefringent crystal 7, and the output planoconcave lens 73 in sequence, and then returns to the concave-convex lens 5 to form a ring optical path. At this time, the waist spot of the signal light between the concave-convex lens 5 and the first transitional planoconcave lens 71 coincides with the focusing waist spot of the pump light, thereby increasing the conversion efficiency of the crystal optical parameter. The center of the birefringent crystal 7 coincides with the waist spot of the signal light between the mirror of the second transitional planoconcave lens 72 and the output planoconcave lens 73, so as to introduce a sufficiently large non-linear loss, realize automatic pumping emptying and stable single longitudinal mode operation of the optical parametric oscillator during the frequency doubling process, and improve the frequency doubling conversion efficiency. During resonance, the waist spot of the pump light coincides with the waist spot of the signal light oscillating in the resonant cavity. The waist spot of the signal light oscillating in the resonant cavity on the optical path between the second transitional planoconcave lens 72 and the output planoconcave lens 73 coincides with the center of the birefringent crystal 7, thereby improving the nonlinear conversion efficiency.

As one embodiment, the back of the second transitional planoconcave lens 72 is provided with a piezoelectric ceramic for fine adjustment of the cavity length.

In this embodiment, the compact four-concave-mirror ring cavity achieves a small waist-spot structure within the cavity, further improving the conversion efficiency of the optical parametric oscillator.

Figure 2:
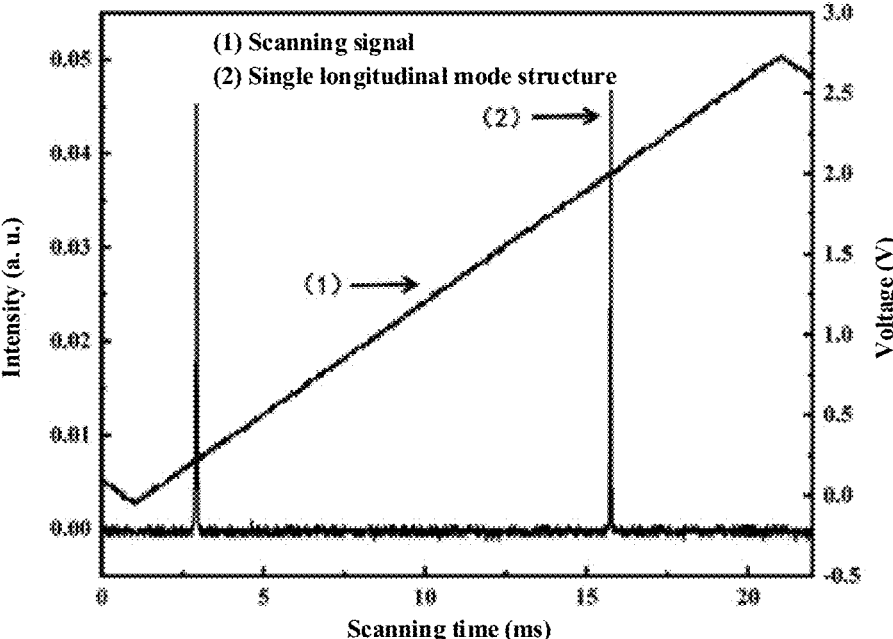
FIG. 2 is a graph showing experimental results of a single longitudinal mode structure of a signal light at an injection pumping power of 20 W after a birefringent crystal is inserted in the embodiment of FIG. 1.

FIG. 2 shows a graph of experimental results of a single longitudinal mode structure of a signal light at an injection pumping power of 20 W after a birefringent crystal is inserted in the embodiment. It can be seen from the figure that after introducing the frequency doubling process, the optical parametric oscillator with this structure can achieve automatic pumping emptying, and then the optical parametric oscillator can realize stable single longitudinal mode operation.

As one example, the optical parametric down-conversion crystal 6 uses MgO:PPLN crystal, the birefringent crystal 7 uses LBO crystal, and the MgO:PPLN crystal adopts quasiphase matching method for phase matching, and the polarization period is selected to be 30.49 μm and the matching temperature is 46.8° C. The LBO crystal is cut by the Class I critical phase matching method ($\theta=90°$) $\varphi=9.6°$ and the matching temperature is 26.7° C. Pump light (1064 nm) is injected into the resonant cavity, and the pump light passes through the optical parametric down-conversion crystal 6 for non-linear frequency conversion, and the generated signal light passes through the birefringent crystal LBO, and at the same time, the 1550 nm resonating in the cavity is converted into 775 nm laser through a frequency doubling process.

The frequency doubling process in the resonant cavity is used to change automatically the coupling output of the signal light in the cavity, and the nonlinear loss introduced in the frequency doubling process is combined to realize a single longitudinal mode operation of the optical parametric oscillator. When a nonlinear crystal is inserted, multiple modes of oscillation in the resonant cavity will interact with the birefringent nonlinear crystal, and frequency doubling and frequency summing will appear between the longitudinal modes. In this case, the nonlinear loss of the secondary oscillation mode will be twice that of the primary oscillation mode, indicating that after introducing the nonlinear loss, the secondary oscillation mode will be suppressed, and only the primary oscillation mode will be oscillating, at this time the laser resonant cavity will remain in single-frequency operation. Moreover, due to the insertion of the nonlinear crystal, the total power of the signal light in the resonant cavity at this time can be expressed as $$P_S = \frac{\lambda_p}{\lambda_s} \left[ \frac{12(k-1)(1+2m)}{(1+m)C\zeta_s} - \frac{24(k-1)^2(1+2m)\varepsilon}{P_p C^2 \zeta_{s2}} \right].$$

$\lambda_p$ and $\lambda_s$ are respectively the wavelengths of the pump light and the signal light, K is the ratio of the wave vector of the pump light and the signal light, m is the ratio of the cavity mode of the pump light and the signal light at the optical parametric down-conversion crystal 6, $P_p$ is the injection power of the pump light, $\zeta_s$ is the focusing parameter of the signal light, and $\varepsilon$ and C are respectively the total loss and the constant, which can be respectively expressed as $\varepsilon = T_S + V + \varepsilon_{SHG}$ and $$C = \frac{128\pi^2 d_{OPO}^2 l_{OPO}^2}{n_p n_s \lambda_i^2 \lambda_s c \varepsilon_o}.$$

Figure 3:
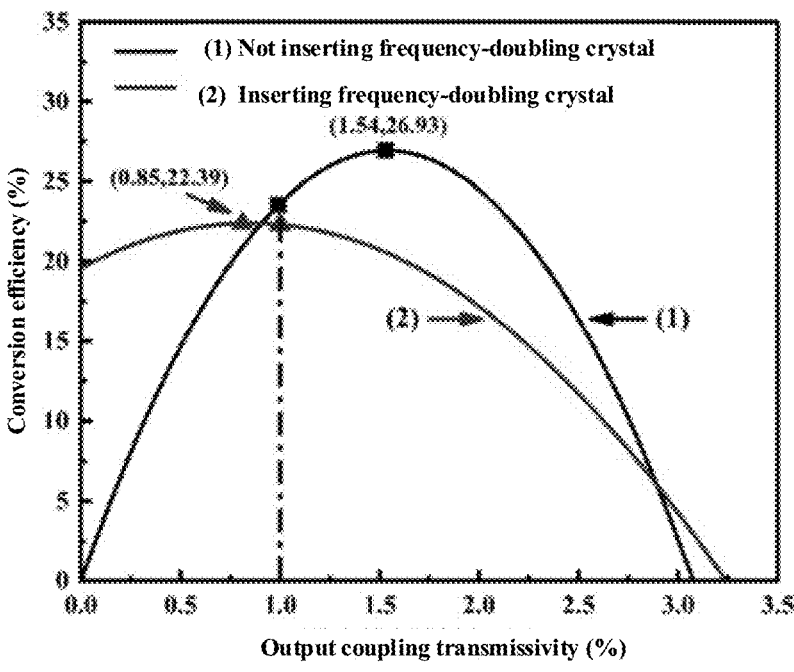
FIG. 3 is a graph showing the change of the conversion efficiency of the signal light obtained without inserting a birefringent crystal and the change of the conversion efficiency of the signal light and frequency doubling light obtained in the embodiment of FIG. 1, with the change of the transmittance of the output planoconcave lens, under a pumping power injection of 20 W.

$T_S$ is the transmissivity of the output planoconcave lens to the signal light, V represents the linear loss in the cavity, $d_{OPO}$ is the effective non-linear coefficient of the optical parametric down-conversion crystal 6, and $l_{OPO}$ is the length of the optical parametric down-conversion crystal 6. $n_p$ and $n_s$ represent the refractive index of the pump light and the signal light respectively in the optical parametric down-conversion crystal 6, $\lambda_i$ is the wavelength of idler light, c is the speed of light in a vacuum, $\varepsilon_0$ is the dielectric constant in a vacuum, $\varepsilon_{SHG}$ is one quantity related to the optical power in the cavity, and the conversion efficiency $$\eta = \frac{P_S T_S + P_S \varepsilon_{SHG}}{P_p}$$

is obtained. By inserting a frequency-doubling crystal (birefringent crystal) in the resonant cavity and combining the same with the transmissivity, an efficient conversion is achieved without changing the parameters of the resonant cavity, thereby achieving automatic pumping emptying. The relevant results are shown in FIG. 3. On this basis, the optical parametric oscillator with this structure can keep the single-frequency operation stable for a long time and improve the stability of the optical parametric oscillator by reducing the resonant optical power in the cavity to further achieve stable output.

As shown in FIG. 3, curve (1) is the change of the conversion efficiency of the signal light obtained when the birefringent crystal is not inserted at a pumping power of 20 W with the transmissivity of the output planoconcave lens; and curve (2) is the change of the conversion efficiencies of the signal light and the frequency-doubled light obtained when the birefringent crystal is inserted at a pumping power of 20 W with the transmissivity of the output planoconcave lens. It can be seen from the figure that after introducing the frequency doubling process in the optical parametric oscillation process, the output coupling of the signal light in the resonant cavity automatically changes (shifts to the left) without changing the parameters of the resonant cavity, and maintains a high conversion efficiency in a certain range, thereby realizing automatic pumping emptying. In the meantime, the introduced frequency doubling process also reduces the signal light power in the resonant cavity to a certain extent, which lays the foundation for realizing stable single longitudinal mode operation and single frequency output of the optical parametric oscillator with the structure. In conjunction with FIG. 4, it can be seen that the experimental structure is consistent with the theoretical prediction.

Figure 4:
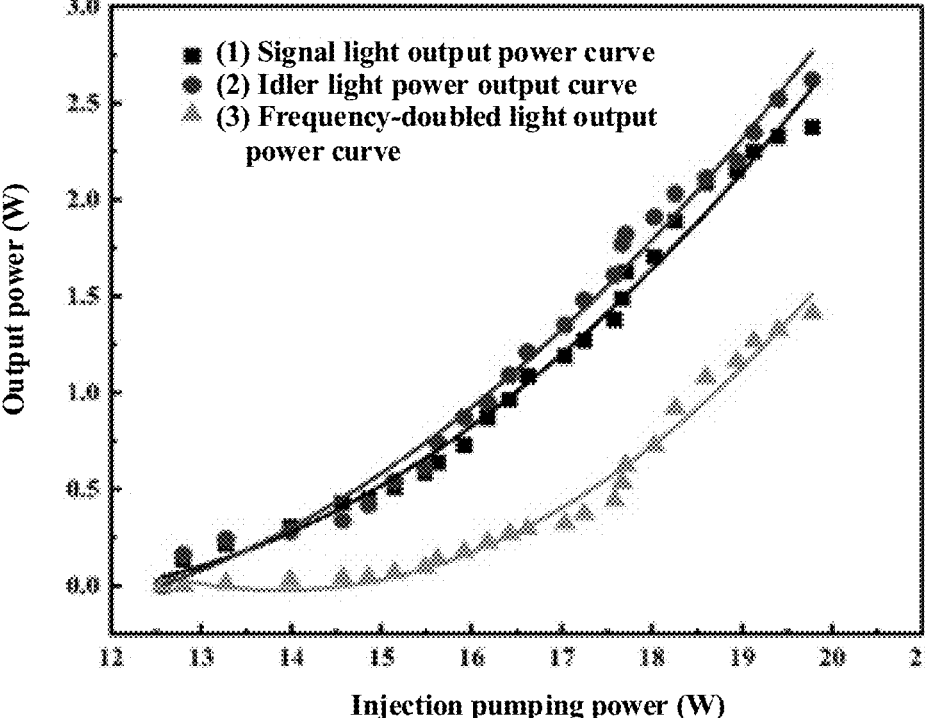
FIG. 4 is a curve graph of the output power for the embodiment of FIG. 1.

FIG. 4 shows a curve graph of the power output of a single-frequency continuous-wave optical parametric oscillator that achieves automatic pumping emptying after introducing the frequency doubling process. By increasing the injection pumping power while also monitoring the single frequency situation under this structure, it can be found that stable single longitudinal mode operation can be maintained from the injection pump threshold (starting point on the left) to the maximum pumping power.

Therefore, in this embodiment, introducing the frequency doubling process can not only automatically modulate the coupling output of the signal light in the cavity and reduce the signal light power oscillating in the cavity, but also can maintain a high conversion efficiency, thereby achieving complete pumping emptying and single longitudinal mode operation. In addition, the frequency doubling process also introduces a large enough nonlinear loss, further inhibiting the oscillation starting of the secondary oscillation mode in the cavity, so that the optical parametric oscillator obtains stable single longitudinal mode operation and watt-level multi-wavelength output.

Embodiment 2

Figure 5:
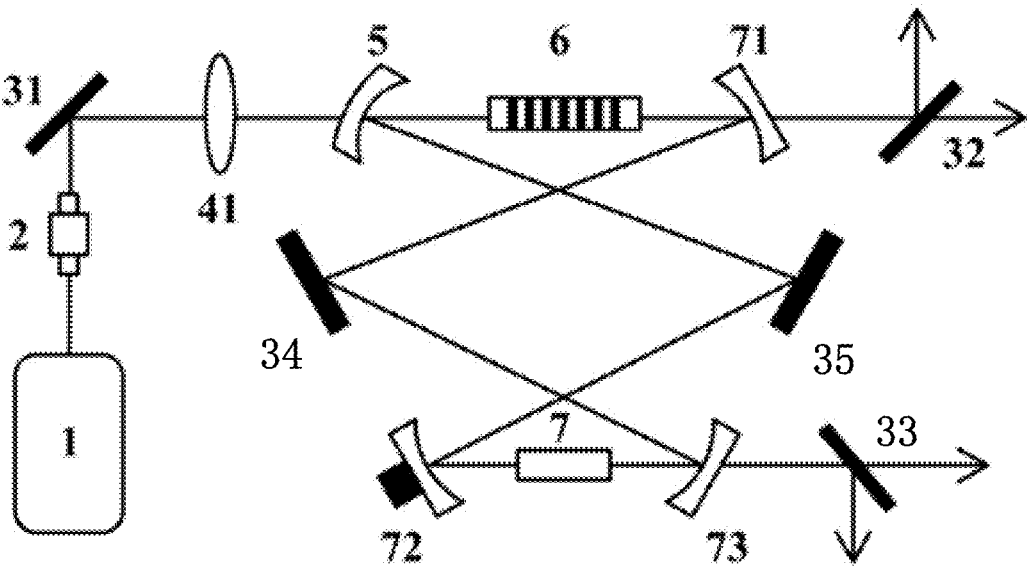
FIG. 5 is a schematic diagram of an optical path structure of embodiment 2 of a single-frequency continuous-wave optical parametric oscillator provided by the present application.

FIG. 5 is a schematic diagram of an optical path structure of embodiment 2 of a single-frequency continuous-wave optical parametric oscillator provided by the present application. This embodiment differs from embodiment 1 in that the resonant cavity of this embodiment is a six-mirror ring symmetric cavity. The six-mirror ring symmetric cavity comprises a concave-convex lens 5, a first transitional planoconcave lens 71, a fourth plane mirror 34, a fifth plane mirror 35, a second transitional planoconcave lens 72 and an output planoconcave lens 73. The optical parametric down-conversion crystal 6 is placed between the concave-convex lens 5 and the first transitional planoconcave lens 71, and the center of the optical parametric down-conversion crystal 6 is the waist spot focus of the pump light. The birefringent crystal 7 is placed between the second transitional planoconcave lens 72 and the output planoconcave lens 73, and the center of the birefringent crystal 7 coincides with the waist spot position of the signal light between the second transitional planoconcave lens 72 and the output planoconcave lens 73.

The surface of the concave-convex lens 5 is plated with a high-transmittance film for pump light and a high-reflection film for signal light. The surface of the first transitional planoconcave lens 71 is plated with a high-transmittance film for pump light and idler light and a high-reflection film for signal light. The surfaces of the fourth plane mirror 34 and the fifth plane mirror 35 are plated with a high-reflection film for signal light. The surface of the second transitional planoconcave lens 72 is plated with a high-reflection film for signal light. The surface of the output planoconcave lens 73 is plated with a partial-transmittance film (e.g. 1%) for signal light and a high-transmittance film for frequency-doubled light.

In the ring cavity, the signal light passes through the concave-convex lens 5, the optical parametric down-conversion crystal 6, the first transitional planoconcave lens 71, the fourth plane mirror 34, the output planoconcave lens 73, the birefringent crystal 7, the second transitional planoconcave lens 72 and the fifth plane mirror 35 in sequence and then returns to the concave-convex lens 5 to form a ring optical path. During resonance, the waist spot of the pump light coincides with the waist spot of the signal light oscillating in the resonant cavity. The waist spot of the signal light oscillating in the resonant cavity on the optical path between the second transitional planoconcave lens 72 and the output planoconcave lens 73 coincides with the center of the birefringent crystal 7, thereby improving the nonlinear conversion efficiency.

The principle of this embodiment is the same as that of embodiment 1, and the four-mirror ring cavity and the six-mirror ring symmetric cavity essentially have no change in the cavity type structure. Therefore, the output characteristics of the optical parametric oscillator resonant cavity with this structure do not change. Compared with the four-mirror ring cavity, the six-mirror ring symmetric cavity increases the length of the resonant cavity, and the increase of cavity length can further reduce the intensity noise of the output laser.

On the basis of the above, it could be understood that the resonant cavity may also be a ring cavity structure such as an eight-mirror ring cavity.

Embodiment 3

Figure 6:
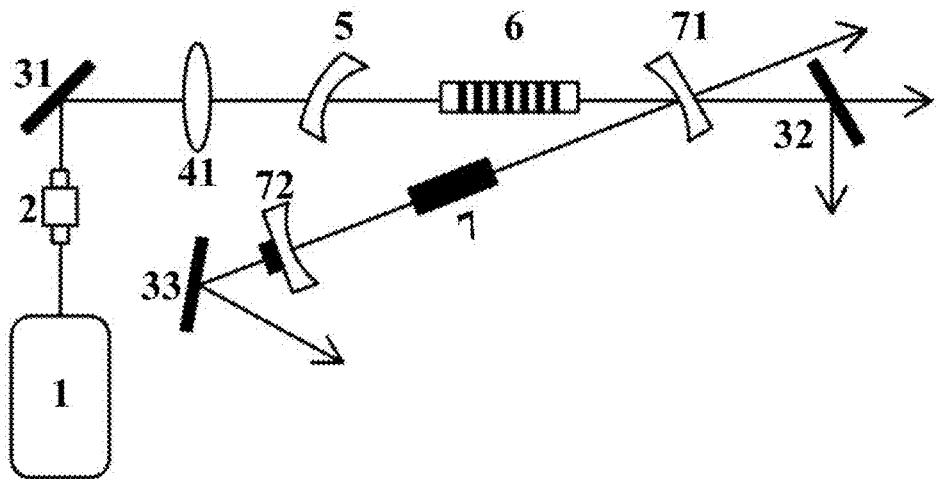
FIG. 6 is a schematic diagram of an optical path structure of embodiment 3 of a single-frequency continuous-wave optical parametric oscillator provided by the present application.

FIG. 6 is a schematic diagram of an optical path structure of embodiment 3 of a single-frequency continuous-wave optical parametric oscillator provided by the present application. This embodiment differs from embodiment 1 in that the resonant cavity is a standing wave cavity. In the standing wave cavity, the first transitional planoconcave lens and the output planoconcave lens are the same planoconcave lens. Namely, the standing wave cavity comprises the concave-convex lens 5, the first transitional planoconcave lens 71 and the second transitional planoconcave lens 72. The optical parametric down-conversion crystal 6 is placed between the concave-convex lens 5 and the first transitional planoconcave lens 71, and the center of the optical parametric down-conversion crystal 6 is the waist spot focus of the pump light. The birefringent crystal 7 is placed between the first transitional planoconcave lens 71 and the second transitional planoconcave lens 72, and the center of the birefringent crystal 7 coincides with the waist spot position of the signal light between the first transitional planoconcave lens 71 and the second transitional planoconcave lens 72.

The surface of the concave-convex lens 5 is plated with a high-transmittance film for pump light and a high-reflection film for signal light. The concave surface of the first transitional planoconcave lens 71 is plated with a high-transmittance film for pump light, idler light and frequency-doubled light and a high-reflection film for signal light. All of the pump light directly passing through the optical parametric down-conversion crystal 6 and the idler light generated by the optical parametric down-conversion crystal 6 are transmitted through the first transitional planoconcave lens 71 and reach the second plane mirror 32; the second plane mirror 32 is used for separating the pump light and the idler light output by the first transitional planoconcave lens 71; the pump light is transmitted through the second plane mirror 32 and output; and the idler light is reflected by the second plane mirror 32 and output. The frequency-doubled light generated by the birefringent crystal 7 is transmitted through the first transitional planoconcave lens 71 and then separately output. The surface of the second transitional planoconcave lens 72 is plated with a partial-transmittance film for the signal light, and a part of the signal light is output after being transmitted by the second transitional planoconcave lens 72 and is output to other components and parts after being reflected by the third plane mirror 33. At the same time, the remaining part of the signal light resonates in the standing wave cavity.

In the standing wave cavity, the signal light successively passes through the concave-convex lens 5, the optical parametric down-conversion crystal 6, the first transitional planoconcave lens 71, the birefringent crystal 7, the second transitional planoconcave lens 72, the birefringent crystal 7 and the first transitional planoconcave lens 71 and then returns to the concave-convex lens 5. During resonance, the waist spot of the pump light coincides with the waist spot of the signal light oscillating in the resonant cavity, so as to improve the conversion efficiency of the optical parametric oscillation process. The waist spot of the signal light oscillating in the resonant cavity on the optical path between the first transitional planoconcave lens 71 and the second transitional planoconcave lens 72 coincides with the center of the birefringent crystal 7, thereby improving the nonlinear conversion efficiency.

In this embodiment, the cavity-type structure of the standing wave cavity is simpler than that of the ring cavity, and it is easier to adjust the relative positions of the cavity mirrors to achieve more accurate mode matching.

Compared with the prior art, the single-frequency continuous-wave optical parametric oscillator for realizing automatic pumping emptying provided in the present application realizes an optical parametric oscillation process and a frequency doubling process in a single resonant cavity, and at the same time realizes a long-time stable single longitudinal mode operation and a three-wavelength output of a signal light, a frequency doubling light and an idler light. The laser output powers of the three wavelengths can all reach a watt level, and realize the advantages of an automatic pumping emptying by combining a non-linear process and an output coupling transmitting mirror without changing a resonance parameter. In addition, technologies like inserting an etalon or seed light injection locking are no longer required in the present application, which greatly reduces the manufacturing costs and debugging difficulties. At the same time, the introduction of a non-linear process also reduces problems such as thermal effects caused by excessive optical power density in the cavity, so that the output laser power and single longitudinal mode operation are more stable. The cavity-type structure of the resonant cavity of the optical parametric oscillator with this structure is compact, which greatly reduces the operating difficulty of the system, and is more conducive to full solidification and miniaturization of the structure, making it conducive to commercial mass production.

Figure 8:
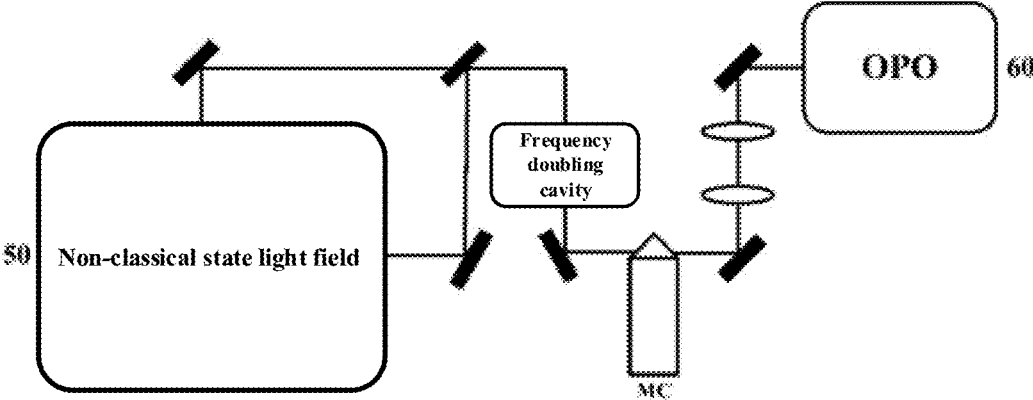
FIG. 8 is a schematic diagram of the structure of a single-frequency continuous-wave optical parametric oscillator in the prior art applied to a continuous variable non-classical light field.

In the application of a single-frequency continuous-wave optical parametric oscillator OPO to a non-classical state light field, the structure of the prior art is as shown in FIG. 8. The non-classical state light field system comprises a single-frequency continuous-wave optical parametric oscillator OPO 60, a mode cleaner MC, an optical parametric amplifier, a non-classical state light field 50, etc. At present, the common method for generating continuous variable non-classical state light fields is to use the signal light and frequency doubling light of the same as the seed light and pump light of the optical parametric amplifier, respectively, to generate bright squeezed states. Two squeezed states generated by two optical parametric amplifiers then interact with each other to form entangled state light fields. In general, in order to realize the frequency-doubling output of signal light, a frequency-doubling cavity needs to be built outside the cavity of OPO 60, which results in the increase of optical system volume in limited space, making it not conducive to the miniaturization of non-classical light sources, and also increases the difficulty of debugging the entire optical system.

Figure 7:
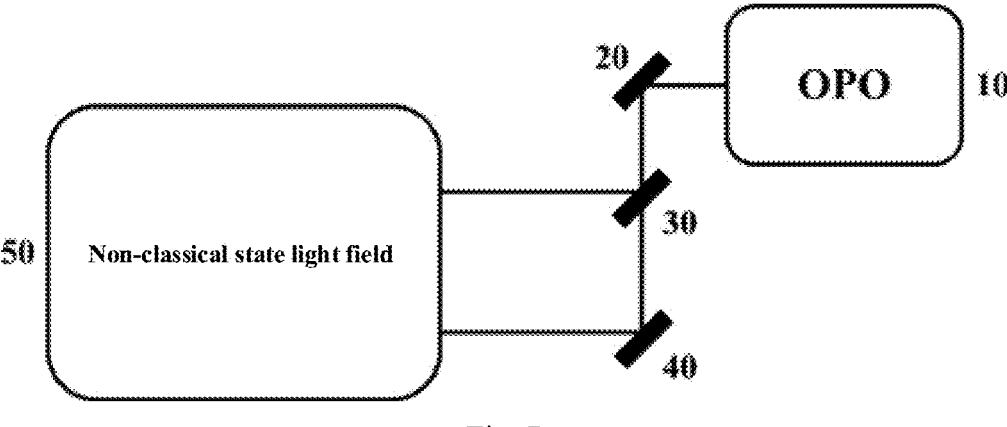
FIG. 7 is a schematic diagram of the structure of a single-frequency continuous-wave optical parametric oscillator of the present application applied to a continuous variable non-classical light field.

FIG. 7 is a schematic structural diagram showing an example of application of the single-frequency continuous-wave optical parametric oscillator of the present application to a non-classical light field. In FIG. 7, the non-classical light field system comprises OPO 10 of the present application, a plane mirror 20, a plane mirror 30, a plane mirror 40 and a non-classical state light field 50. The plane mirror 20 is plated with a high-reflection film for signal light and frequency doubling light, the plane mirror 30 is plated with a high-transmittance film for signal light and a high-reflection film for frequency doubling light, and the plane mirror 40 is plated with a high-reflection film for signal light. The frequency-doubled light and signal light output by the OPO 10 are reflected to the plane mirror 30 after passing through the plane mirror 20; the frequency-doubled light enters the non-classical state light field 50 after being reflected by the plane mirror 30; and the signal light enters the non-classical state light field 50 after being transmitted through the plane mirror 30 and being reflected by the plane mirror 40.

Since the single-frequency continuous-wave optical parametric oscillator OPO 10 of the present application can also output the watt-level frequency-doubled light on the basis of ensuring the single longitudinal mode operation of the signal light, the frequency-doubled cavity, the signal light mode cleaner MC and a series of shaping lens groups in front of the cavity in the prior art are omitted in the subsequent establishment of the non-classical light field system, which greatly simplifies the structure and further facilitates the miniaturization of the non-classical light source.

While some specific embodiments of the application have been described in detail by way of examples, it should be understood by those skilled in the art that the foregoing examples are illustrative only and are not intended to limit the scope of the application. Technicians in this field should understand that the above embodiments can be modified without departing from the scope and spirit of the present application. The scope of the present application is limited by the attached claims.

The invention claimed is:

1. A single-frequency continuous-wave optical parametric oscillator, characterized by comprising a pumping source, a focusing lens, a resonant cavity, an optical parametric down-conversion crystal, and a birefringent crystal;

wherein a polarization direction of a pump light provided by the pumping source is horizontal polarization;

the resonant cavity comprises a concave-convex lens, an output planoconcave lens and at least two transitional planoconcave lenses arranged between the concave-convex lens and the output planoconcave lens, a waist spot of the pump light obtained by the focusing lens is located between the concave-convex lens and a first transitional planoconcave lens adjacent to the concave-convex lens on an optical path, and a center of the optical parametric down-conversion crystal coincides with the waist spot of the pump light; and the birefringent crystal is located at a beam waist between the output planoconcave lens and a second transitional planoconcave lens adjacent to the output planoconcave lens on an optical path, and the birefringent crystal adopts critical phase matching or non-critical phase matching so as to generate frequency-doubled light;

a signal light generated by the optical parametric down-conversion crystal resonates in the resonant cavity, and the pump light, the idler light generated by the optical parametric down-conversion crystal, and the frequency-doubled light generated by the birefringent crystal pass through the resonant cavity in a single pass.

2. The single-frequency continuous-wave optical parametric oscillator of claim 1, characterized in that the resonant cavity is a ring cavity.

3. The single-frequency continuous-wave optical parametric oscillator of claim 2, characterized in that in the ring cavity, the signal light passes through the concave-convex lens, the optical parametric down-conversion crystal, the first transitional planoconcave lens, the second transitional planoconcave lens, the birefringent crystal and the output planoconcave lens in sequence.

4. The single-frequency continuous-wave optical parametric oscillator of claim 2, characterized in that the concave surface of the output planoconcave lens is plated with a high-transmittance film for frequency-doubled light and a partial-transmittance film for the signal light.

5. The single-frequency continuous-wave optical parametric oscillator of claim 4, characterized in that the surface of the first transitional planoconcave lens is plated with a high-transmittance film for pump light and idler light and a high-reflection film for the signal light.

6. The single-frequency continuous-wave optical parametric oscillator of claim 1, characterized in that the resonant cavity is a standing wave cavity, and in the standing wave cavity, the first transitional planoconcave lens and the output planoconcave lens are the same planoconcave lens, and the signal light passes through the concave-convex lens, the optical parametric down-conversion crystal, the first transitional planoconcave lens, the birefringent crystal, the second transitional planoconcave lens, the birefringent crystal and the first transitional planoconcave lens in sequence.

7. The single-frequency continuous-wave optical parametric oscillator of claim 6, characterized in that the concave surface of the first transitional planoconcave lens is plated with a high-transmittance film for pump light, idler light, and frequency-doubled light and a high-reflection film for the signal light.

8. The single-frequency continuous-wave optical parametric oscillator of claim 1, characterized in that the birefringent crystal has a shape of a fan-shaped structure, a cuboid with a flat or wedged end face, or a cube with a flat or wedged end face.

9. The single-frequency continuous-wave optical parametric oscillator of claim 1, characterized in that the pumping source is an all-solid-state solid laser and the resonant cavity is end-pumped.

10. The single-frequency continuous-wave optical parametric oscillator of claim 1, characterized in that the resonant cavity is a ring cavity.

11. The single-frequency continuous-wave optical parametric oscillator of claim 10, characterized in that in the ring cavity, the signal light passes through the concave-convex lens, the optical parametric down-conversion crystal, the first transitional planoconcave lens, the second transitional planoconcave lens, the birefringent crystal and the output planoconcave lens in sequence.

12. The single-frequency continuous-wave optical parametric oscillator of claim 10, characterized in that the concave surface of the output planoconcave lens is plated with a high-transmittance film for frequency-doubled light and a partial-transmittance film for the signal light.

13. The single-frequency continuous-wave optical parametric oscillator of claim 12, characterized in that the surface of the first transitional planoconcave lens is plated with a high-transmittance film for pump light and idler light and a high-reflection film for the signal light.

14. The single-frequency continuous-wave optical parametric oscillator of claim 1, characterized in that the resonant cavity is a standing wave cavity, and in the standing wave cavity, the first transitional planoconcave lens and the output planoconcave lens are the same planoconcave lens, and the signal light passes through the concave-convex lens, the optical parametric down-conversion crystal, the first transitional planoconcave lens, the birefringent crystal, the second transitional planoconcave lens, the birefringent crystal and the first transitional planoconcave lens in sequence.

15. The single-frequency continuous-wave optical parametric oscillator of claim 14, characterized in that the concave surface of the first transitional planoconcave lens is plated with a high-transmittance film for pump light, idler light, and frequency-doubled light and a high-reflection film for the signal light.

* * * * *